United States Patent [19]

Sohl

[11] E Re. 31,087

[45] Reissued Nov. 23, 1982

[54] METHOD FOR SEPARATING OIL FROM WATER

[75] Inventor: William E. Sohl, Fayetteville, Ark.

[73] Assignee: Minnesota Mining and Manufacturing Company, St. Paul, Minn.

[21] Appl. No.: 254,757

[22] Filed: Apr. 16, 1981

Related U.S. Patent Documents

Reissue of:

[64] Patent No.: 3,764,527
Issued: Oct. 9, 1973
Appl. No.: 250,373
Filed: May 4, 1972

U.S. Applications:

[63] Continuation of Ser. No. 833,172, Jun. 13, 1969, abandoned.

[51] Int. Cl.[3] ..... E02B 15/04

[52] U.S. Cl. ..... 210/671; 210/693; 210/924

[58] Field of Search ..... 210/505, 508, 671, 693, 210/924; 264/126, 127, 12

[56] References Cited

U.S. PATENT DOCUMENTS

| | | | |
|---|---|---|---|
| 2,571,457 | 10/1951 | Ladisch | 428/398 |
| 3,147,216 | 9/1964 | Oemler | 210/693 |
| 3,231,639 | 1/1966 | Mabru | 264/12 |
| 3,238,056 | 3/1966 | Pall et al. | 210/505 |
| 3,352,778 | 11/1967 | Brink, Jr. et al. | 252/325 |
| 3,353,682 | 11/1967 | Pall et al. | 210/505 |
| 3,426,902 | 2/1969 | Kilpert et al. | 210/179 |
| 3,506,133 | 4/1970 | Lee | 210/505 |
| 3,539,013 | 11/1970 | Smith | 210/242 |
| 3,617,556 | 11/1971 | Cole et al. | 210/671 |

OTHER PUBLICATIONS

Chemistry and Industry, Apr. 22, 1967, p. 632.

*Primary Examiner*—Ivars C. Cintins
*Attorney, Agent, or Firm*—C. Alexander; D. M. Sell; R. R. Tamte

[57] ABSTRACT

A method for separating water-immiscible oils and oil-like substances from mixtures including said oils in an aqueous medium which comprises contacting the mixture with an oleophilic fibrous web comprising large numbers of interconnected, interstitial spaces for reception and retention of the oil to the exclusion of water.

27 Claims, No Drawings

METHOD FOR SEPARATING OIL FROM WATER

Matter enclosed in heavy brackets [ ] appears in the original patent but forms no part of this reissue specification; matter printed in italics indicates the additions made by reissue.

This application is a continuation of copending application Ser. No. 833,172, filed June 13, 1969 now abandoned.

FIELD OF THE INVENTION

The present invention relates to a method for isolating immiscible oils and oil-like substances from mixtures including oil in an aqueous medium.

More particularly the invention relates to separating oils from mixtures of oil in an aqueous medium by means of contacting the mixture with certain oleophilic fibrous webs comprising large numbers of interconnected, interstitial spaces for reception and retention of the oil to the exclusion of the water. In one embodiment the invention provides an effective and esthetic method for removing excess fatty components from liquid cooking media such as soups and gravies. In another embodiment, the invention provides, in industrial applications, an effective method for removing oil films and slicks from water surfaces as well as for removing emulsified or suspended oil from water. The term "oil" as used herein is to be construed as meeting the definition of the term as found in Hackh's Chemical Dictionary, 3rd Edition, The Blackiston Co., Inc. New York, Toronto, 1953.

PRIOR ART

The difficulty with which water-immiscible liquids, such as oils, are separated from aqueous media has generated several approaches to the problem. Thus separating and skimming devices and processes are known in the art which are capable of separating oil and other immiscible substances from water with varying degrees of success. For example, batches of soups or broths are often cooled after cooking and the layer of fat is manually removed from the surfaces. In the industrial area, for example, U.S. Pat. No. 3,146,192 to McClintock, teaches the removal of oil from refinery waste water streams by passing a polymeric sheet of polyethylene or polypropylene over the surface of the oil/water mixture whereby oil is absorbed on the oleophilic sheet; recovery amounts to about one gram of oil per 16 square inches of sheet surface. U.S. Pat. No. 3,426,902, to Kilpert, describes a skimming apparatus comprising a polypropylene, polyethylene or polyurethane sponge affixed to a rotating drum whereby the suction of the expanding sponge is employed to "skim" the oil layer from the water mixture. See also, U.S. Pat. Nos. 3,314,540; 3,259,245; 3,358,838; 3,265,616; 3,215,623; 3,219,190 and 3,214,368, describing similar or related methods. Most prior art methods, however, are relatively inefficient, separating relatively small amounts of oil in relation to the quantity of, e.g., polymeric sheet employed, or they fail to totally separate the immiscible components of the two phase system, e.g., in the case of skimming devices, water is often skimmed off with the separated oil, necessitating further treatment. The method of the present invention is not to be confused with methods which have been proposed employing sponges or blotting paper, etc., sometimes treated with oleophilic materials. Those devices are incapable of functioning with the efficiency possible in the method of this invention, in which the fibrous webs employed are capable of adsorbing and retaining up to 20 times their weight of oil; the oil can be expressed by pressure, or the whole web including the adsorbed oil can be subjected to reclamation as by e.g., heating to "cracking" temperatures (with or without catalysts), as when petroleum oils are recovered.

It is therefore an object of this invention to provide a method for effectively separating immiscible oils from systems comprising oil in an aqueous medium. A further object is to provide a convenient and esthetic method for removing fats and greases from soups, gravies and other prepared foods. A still further object is to provide an effective industrial method for removing oil films and slicks from water surfaces as well as for removing emulsified or suspended oil from water.

The above objects are attained by contacting a mixture of water-immiscible oils in an aqueous medium with an oleophilic fibrous web having large numbers of interconnected interstitial voids into which the oil is received and retained substantially to the exclusion of the water.

The mixture may comprise two separate phases having one interfacial layer, e.g., a "slick" or it may comprise a multi-interfacial system having many discrete interfaces, e.g., an emulsion. Generally speaking, fiber-forming materials which are effective as fibrous webs in carrying out the process of the invention are those which are preferentially wetted by the oil of an oil-water mixture to the extent that water will be rejected from the internal voids of the web, while the oil will be retained. While not all fiber-forming materials are useful for this purpose, it has been observed that a large variety of fiber-forming materials will function within the scope of the inventive method. These operable fiber-forming materials may be defined broadly as those materials (normally polymeric) which when immersed in an oil-water mixture, allow the oil to displace water from a smooth surface thereof and to form a contact angle with said surface of less than 90°. Generally, the effectiveness of the fiber-forming material has an inverse relationship to the size of the above described contact angle. Thus, polypropylene and polyethylene surfaces allow oil to assume a contact angle of substantially zero degrees and therefore fibers of these polymers provide the preferred webs for practicing the invention.

If surface energy parameters for the components of the particular system (e.g., water, oil, and fiber) are known or determinable by methods well known in the art the following criteria may also be employed to determine whether a particular fibrous material will function within the scope of the invention:

The work of adhesion ($W_a$) of an oil/solid (i.e., fiber) interface under consideration as a means for effecting the disruption of a water/solid interface, is first calculated; next the work of cohesion ($W_c$) of the oil/water interface is calculated. The following mathematical relationships may then be applied to determine the usefulness of a particular fiber-forming material in practicing the invention:

1. if:

$$W_a - W_c \geqq 0$$

Then, substantially unlimited wetting of oil on a smooth film surface of the fiber-forming material occurs in the presence of water.

2. if:

$$W_a - W_c/2 \geqq 0$$

Then, in a substantially uniform capillary of the fiber-forming material, oil will disrupt a water/solid (fiber) interface, wet the capillary and cause rejection of the water. In other words, whenever, $W_a$ is greater than one-half to 1 times the value of $W_c$ in the system under consideration, the fibrous material is considered to be useful in practicing the invention.

It must be borne in mind, however, that, in selecting a fiber-forming material for a specific application, the material selected must not melt at the highest temperature anticipated in oil-water mixture during the removal operation.

Polymeric fibers found to provide adequate results and falling within the criteria defined above include polyolefin polymers such as polypropylene, polyethylene and copolymers thereof, poly 4-methylpentene, arylene and styrene polymers, as well as polyesters, polyamides and polycarbonates.

Webs may be formed employing any one of several processes well known in the art. Particularly useful webs may be formed according to the teaching of U.S. Pat. Nos. 2,571,457, to Ladisch (where our fibrous webs and masses are therein described as entangled masses of filaments), and 3,231,639, to Mabru (where a method is shown for making fibers of a type which is useful in forming webs). It is to be understood that within the scope of this invention fiber diameters and web densities may be varied within a considerably wide range, depending on the particular oil-separating operation involved. For most operations, webs including fibers ranging in diameter from $0.1\mu$ to $250\mu$ have proved effective, acceptable web density, expressed as a percent of fiber density ranges from about 2 to 65, preferably 4 to 35. It will be apparent to those skilled in the art that the lower the density of the web (commensurate with the density and viscosity of the oil to be removed and other factors which will be apparent to the art, which govern the size of the interstices which can retain the oil as a body, rather than a film on the surface of the fibers) the more capable the web is to receive and retain large amounts of oil. Thus preferably the web density is as low as practical for the particular operation as will be apparent from the following exemplary embodiments.

The work of adhesion ($W_a$) may be characterized as the interfacial tension between water and the oil in question plus the interfacial tension between water and the solid (fiber) in question minus the interfacial tension between the oil and the solid (fiber). The work of cohesion ($W_c$) may be characterized as twice the interfacial tension between the oil and water. These interfacial tension values, may be computed from a knowledge of the contributing factors, apparent to those skilled in the art of physical chemistry, of dispersion forces and polar interactions to the surface energies of the components of the system i.e., water, oil and solid (fiber). See e.g., Contact Angle, Wettability, and Adhesion, Advances in Chemistry Series, Ch. 6 p. 99 ff, American Chemical Society, Washington, D.C., 1964.

Thus fiber-forming materials useful in practicing the invention may be defined as those which in interacting with an oil-water system, satisfy the relationship, $$W_a - W_c/2 \geqq 0.$$

However, preferred materials of the invention satisfy the more stringent relationship, $$W_a - W_c \geqq 0$$

which defines those materials which are substantially totally hydrophobic and which, when employed in practicing the invention, reject water vigorously from web voids and retain oil. Examples of fibrous materials satisfying the more stringent relationship include polypropylene and polyethylene, polytrifluorochlorethylene and polytetrafluoroethylene. The broader relationship, $$W_a - W_c/2 \geqq 0,$$

describes the less preferred materials, namely those exhibiting lower degrees of hydrophobicity and ability to reject water among the materials useful in practicing the invention. These "less desirable" materials are nevertheless useful in certain applications, such as in applications where total removal of oils of greases is not desired or necessary as in certain types of food preparations.

DEGREASING LIQUID FOOD

The tendency of fatty layers to form on the surfaces of soups, gravies, stews, and other cooking media presents problems from both diet and esthetic standpoints. In the past, removal of these fatty layers has been effected in several ways, such as by degreasing, freezing followed by mechanical skimming, or simply ladeling. The inefficiency of these methods is obvious. The present invention provides a method for the effective and ready removal of said fatty components while simultaneously rejecting the water phase and the constituents contained therein. The web may be maintained on the surface of the cooking media during the entire cooking procedure (provided that the web material selected is not susceptible to melting at the cooking temperatures). In this application the web is normally comprised of food-grade approved polypropylene fibers and may optionally be shaped so as to fit the aperture of the cooking vessel and further may be embossed to increase esthetic appeal. Preferably the web is held within, or supported by, an apertured retainer or support. Generally for degreasing liquid foods, webs are employed comprised of fibers having diameters ranging from approximately 0.1 micron to approximately 100 microns; web density, expressed as a percentage of fiber density, may range from about 2 to 35%. Preferably in this type of application 90% of the fibers comprising the web are within a diameter ranging from between about 1 to about 5 microns while the preferred density, expressed as a percentage of fiber density, ranges between approximately 4 and 8%. While the foregoing specifications have been observed to provide for optimum overall performance in the degreasing of liquid foods, it should be noted that they may be varied in different applications without departing from the scope of this invention. The above described optimum web was observed to have removed fatty components for liquid foods in an amount exceeding 10 times the weight of dry web. Furthermore the web was operative at all temperatures up to and including the boiling point of the water phase so long as the fatty component was not in a solid state.

REMOVAL OF EMULSIFIED OILS IN WATER

In the past separation of emulsified oil in an aqueous medium has been effected by allowing the emulsion to "settle" over a period of time so as to allow the differential densities of the two phases to form a single interfacial system. Once the single interfacial system has been formed separation was accomplished by, e.g., one of several skimming processes. The present invention is applicable in cases where breaking down of the emulsion is not feasible or where the time element cannot be tolerated.

Thus, for example, a fibrous plug of polypropylene measuring one-half inch in diameter and three-eighths inches in length weighing 0.1 gram was observed to remove substantially 100% of the oil in an emulsion consisting of 2 cubic centimeters of oil in 40 cubic centimeters of water when the oil-water mixture flowed in a one-half inch vertical pipe through said plug under the influence of gravity alone.

The following additional examples are included to provide a clear understanding of the method of the invention and are not to be unnecessarily construed as limiting the scope thereof.

EXAMPLE I 18.95 g. of mineral oil was mixed with approximately 1,500 ml of water at room temperature in a pyrex dish having a depth of 100 mm and a diameter of 190 mm. The oil has a viscosity of 11.71/14.38 centistokes at 100° F. A web of polypropylene microfibers measuring 4 inches×4 inches and weighing 1.39 g. was then placed on the surface of the oil-water mixture for 1.5 minutes after which it was noted to be saturated with oil. The saturated web then removed from the mixture and the amount of oil contained therein was calculated by weighing. The amount of isolated oil was noted to b 18.0 g. or 95% of the original amount. The remaining oil in the mixture was substantially totally removed with a second clean web. The 18.0 g. of oil removed in the first operation represented at 1,295% removal of oil based on the weight of the fibers.

EXAMPLE II 20.0 g. of lard was added to a beaker containing approximately 2 liters water maintained at 80°-85° C. and thoroughly mixed therewith. A web of polypropylene microfibers measuring 4 inches×4 inches and weighing 1.15 g. was placed on the surface of the mixture and maintained thereon for approximately 40 seconds. Upon removal and weighing the web was observed to contain 12.58 g. of lard or 1090% based on the weight of the dry web.

EXAMPLE III

The procedure of Example II was repeated except that 20.25 g/ of beef fat was substituted for the lard and the web was maintained on the fat-water surface for 16 seconds. The web was observed to have removed 11.93 g. of beef fat or 1,040% based on the weight of the dry web.

EXAMPLE IV 200 ml of mineral oil identical to that used in Example I was poured onto a surface of approximately 1,500 ml of water at room temperature. A web of nylon microfibers measuring 4 inches×4 inches and weighing 0.60 g. was placed on the surface of the mixture. The web was observed to have been saturated within approximately one second. Upon removal and weighing the web was observed to contain a 6.88 g. of oil or 1,145% based on the weight of the dry web.

What is claimed is:

1. A method for isolating water-immiscible oils from a mixture of said oils in an aqueous medium, said method comprising:

a. contacting the mixture with a fibrous web which comprises a plurality of entangled oleophilic fibers, said fibers being hydrophobic in the presence of oil and having a diameter size in the range between about 0.1 micron to about 100 microns; said fibrous web having a bulk density, expressed as a percentage of fiber density, in the range between about 2 percent and about 35 percent;

b. allowing the oil to wet the fibrous web to the exclusion of the aqueous medium; and c. removing the fibrous web from said mixture.

2. The method of claim 1 wherein the fibrous web comprises a material the surface of which, when contacted by oil in the presence of water, allows the oil to assume a contact angle with said surface which is substantially zero.

3. The method of claim 1 wherein at least 90 percent of the fibers comprising said web have diameters ranging between about 1 micron and about 5 microns, and wherein the web density, expressed as a percentage of fiber density, is between about 4 percent and about 8 percent.

4. The method of claim 1 wherein the fibers comprising the said web are of a material selected from the group consisting of polyesters, polyamides and polycarbonates.

5. The method of claim 1 wherein the fibers comprising said web are of a material selected from the group consisting of polypropylene, polyethylene and copolymers thereof, poly-4-methylpentylene, polytrifluorochloroethylene and polytetrafluoroethylene.

6. The method of claim 1 in which the oil-water mixture to be separated is in a relatively static state.

7. The method of claim 1 wherein the oil-water mixture to be separated is passed through said fibrous web.

8. The method of claim 1 wherein the isolated oil is removed from said web by squeezing the web.

9. The method of claim 1 wherein said isolated oil and said web are reclaimed by catalytic cracking.

10. The method of claim 1, wherein said isolated oil and said web are reclaimed by thermal cracking.

11. The method of claim 1 wherein said oleophilic fibers comprise a polyolefin polymer.

12. The method of claim 1 wherein said oleophilic fibers are polypropylene.

*13. A method for isolating water-immiscible oils from a mixture of said oils in an aqueous medium, said method comprising:*

*a. contacting the mixture with a fibrous web which comprises a plurality of entangled oleophilic fibers prepared by extruding liquid fiber-forming material through an opening into a gaseous stream where the extruded material is disrupted and drawn into fibers and then collected as a mass of said entangled fibers, said fibers being hydrophobic in the presence of oil and having a diameter size in the range between about 0.1 micron to about 100 microns; said fibrous web having a bulk density, expressed as a percentage of fiber*

*density, in the range between about 2 percent and about 35 percent;*

*b. allowing the oil to wet the fibrous web to the exclusion of the aqueous medium; and*

*c. removing the fibrous web from said mixture.*

*14. A method of claim 13 wherein 90 percent of the fibers comprising said web have diameters ranging between about 1 micron and about 5 microns.*

*15. A method of claim 13 or 14 wherein the fibrous web has a bulk density, expressed as a percentage of fiber density, in the range between about 4 and 8 percent.*

*16. A method of claim 13 or 14 wherein the said oleophilic fibers are polypropylene fibers.*

*17. A method of claim 1 in which the fibrous web is laid on the surface of the aqueous medium so as to contact said mixture with the web, and the fibrous web comprises a plurality of entangled oleophilic microfibers which are hydrophobic in the presence of oil and which are prepared by extruding liquid fiber-forming material through an opening into a gaseous stream where the extruded material is disrupted and drawn into fibers and then collected as a mass of said entangled fibers.*

*18. A method of claim 17 wherein the microfibers comprise polypropylene.*

*19. A method of claim 17 wherein 90 percent of the fibers comprising said web have diameters ranging between about 1 micron and about 5 microns.*

*20. A method of claim 17 or 19 wherein the fibrous web has a bulk density, expressed as a percentage of fiber density, in the range between about 4 and 8 percent.*

*21. A method of claim 1 in which the fibrous web comprises a plurality of entangled oleophilic microfibers which are hydrophobic in the presence of oil, and which are prepared by extruding liquid fiber-forming material through an opening into a gaseous stream where the extruded material is disrupted and drawn into fibers and then collected as a web of said entangled fibers; said fibrous web including large numbers of interconnected interstitial voids into which oil is received and retained substantially to the exclusion of water.*

*22. A method of claim 21 wherein the microfibers comprise polypropylene.*

*23. A method of claim 21 wherein 90 percent of the fibers comprising said web have diameters ranging between about 1 micron and about 5 microns.*

*24. A method of claim 21 or 23 wherein the fibrous web has a bulk density, expressed as a percentage of fiber density, in the range between about 4 and 8 percent.*

*25. A method of claim 1 in which the fibrous web is laid on the surface of the aqueous medium so as to contact said mixture with the web, and the fibrous web comprises a plurality of entangled oleophilic polypropylene microfibers which are hydrophobic in the presence of oil and which are prepared by extruding liquid-forming material through an opening into a gaseous stream where the extruded material is disrupted and drawn into fibers and then collected as a web of said entangled fibers; said fibrous web including large numbers of interconnected interstitial voids into which oil is received and retained substantially to the exclusion of water.*

*26. A method of claim 25 wherein 90 percent of the fibers comprising said web have diameters ranging between about 1 micron and about 5 microns.*

*27. A method of claim 25 or 26 wherein the fibrous web has a bulk density, expressed as a percentage of fiber density, in the range between about 4 and 8 percent.*

* * * * *